Dec. 9, 1947.  R. K. POTTER  2,432,123
TRANSLATION OF VISUAL SYMBOLS
Filed April 5, 1945  3 Sheets-Sheet 1
FIG. 1
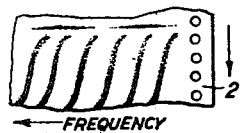
←— FREQUENCY
FIG. 2A
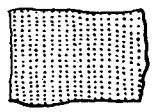
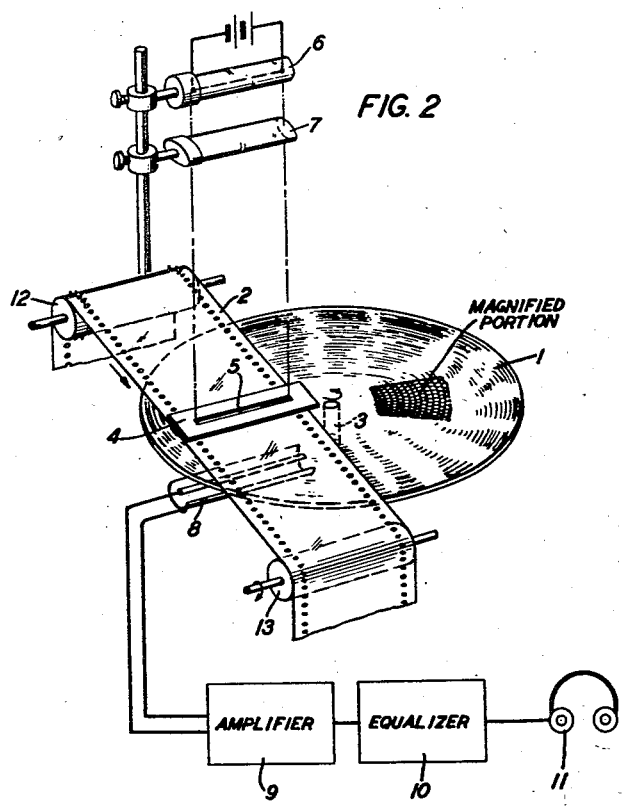
FIG. 2
INVENTOR
R. K. POTTER
BY
ATTORNEY Dec. 9, 1947.  R. K. POTTER  2,432,123
TRANSLATION OF VISUAL SYMBOLS
Filed April 5, 1945  3 Sheets-Sheet 2
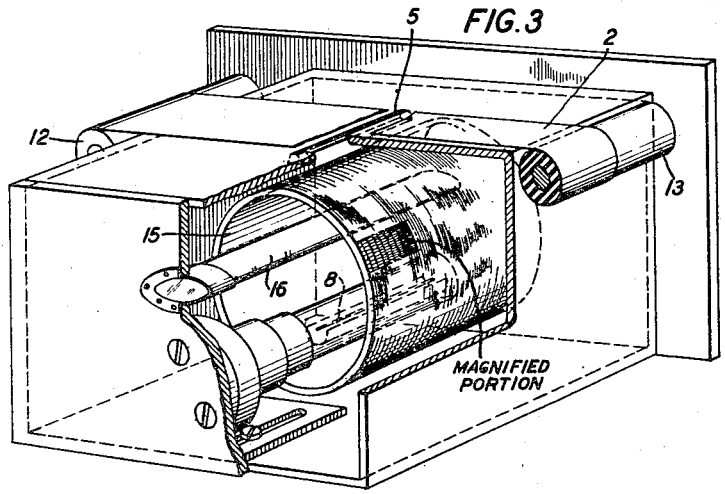
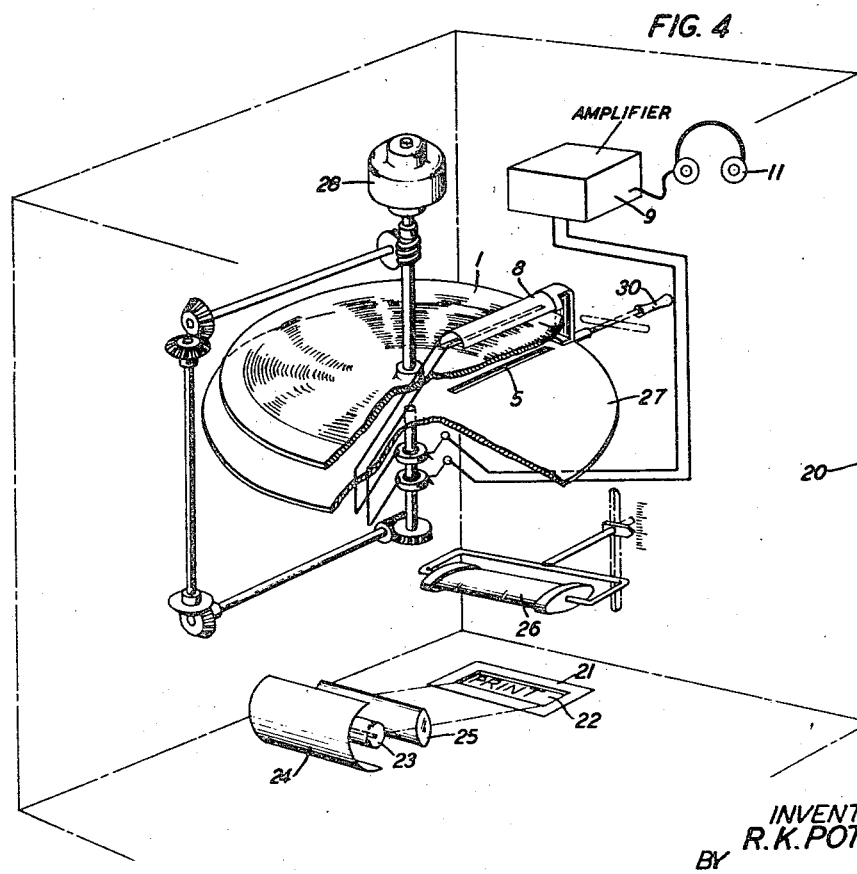
INVENTOR
R. K. POTTER
BY
ATTORNEY Dec. 9, 1947.    R. K. POTTER    2,432,123
TRANSLATION OF VISUAL SYMBOLS
Filed April 5, 1945    3 Sheets-Sheet 3

INVENTOR
R. K. POTTER
BY
N. D. Ewing
ATTORNEY

Patented Dec. 9, 1947

2,432,123

UNITED STATES PATENT OFFICE 2,432,123

TRANSLATION OF VISUAL SYMBOLS

Ralph K. Potter, Morristown, N. J., assignor to Bell Telephone Laboratories, Incorporated, New York, N. Y., a corporation of New York Application April 5, 1945, Serial No. 586,768

16 Claims. (Cl. 35—1)

In my copending application Serial No. 586,769, filed of even date herewith, among others, I have disclosed methods and means for deriving from sound waves in general, and from speech waves in particular, a visual record or "spectrogram" that displays the variations in envelope amplitude, or effective intensity, of each of the frequency components of the sound waves at different positions across the record, these positions being preassigned respectively corresponding, different components. One of the dimensional coordinates of the record, the width, for example, has the sense of a substantially continuous frequency scale, and the other dimensional coordinate has the sense of a time scale.

One of the objects of the present invention is to synthesize the complex waves that are represented in such a visual record, and more especially to produce from a sound spectrogram representing speech waves, audible waves that conform closely enough with the recorded waves to permit understanding of the speech content thereof.

Whereas the foregoing special objective involves translation of the unusual phonetic symbols that constitute a speech spectrogram, a further object of the invention is to translate other visual symbols, such as printed letters and numerals, into distinctive audible sounds that also can be identified by ear.

Having especially in mind those who are both blind and deaf, I have as a further object the translation of visual symbols into distinctive tactile effects such that the symbols can be identified through the sense of touch.

In accordance with certain embodiments of the invention hereinafter to be described in detail the translation of visual symbols into audible form entails optically scanning each visual symbol in succession to detect the variations that appear along each of a multiplicity of collateral bands extending across the symbol, generating a multiplicity of waves of different frequencies, and simultaneously varying the strength of each generated wave in accordance with the variations detected in a respectively corresponding collateral band. In other embodiments the variations detected in each of the bands are translated into variations in the excitation of respectively corresponding tactile stimulators.

The nature of the present invention and its various objects and features will appear more fully from a consideration of the embodiments to be described herein with reference to the accompanying drawings. In the latter, Fig. 1 shows a fragment of a speech spectrogram;

Fig. 2 illustrates a system for reproducing sound waves from a spectrogram;

Fig. 2A shows a modification of a detail of Fig. 2;

Fig. 3 illustrates a modified form of the Fig. 2 system;

Fig. 4 illustrates a system for translating printed characters into distinctive sounds;

Figure 5:
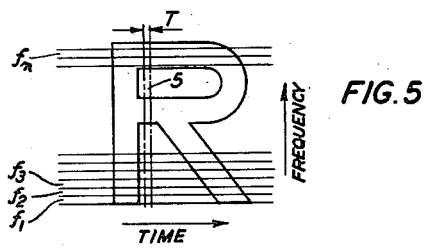
Fig. 5 is a diagram illustrating certain features of the Fig. 4 system.

The translation of a spectrogram that visually represents speech waves into equivalent acoustic form presents certain difficulties that are encountered in lesser degree or not at all in the translation of other sound spectrograms. This difference is due in part to the complexity and variety of the wave effects that constitute normal speech and in part also to the accuracy with which such effects must be synthesized if the reproduced waves are to be intelligible. In contrast with piano music, for specific example, speech waves conform with no fixed key and scale. The fundamental speech frequency is continuously variable and the harmonics associated with any given voiced sound are likewise continuously variable as to both frequency and frequency interval. Unvoiced speech sounds, furthermore, do not exhibit any harmonic structure; the wave energy, like that of resistance noise, is distributed substantially continuously over a wide frequency range. Voiced consonants, likewise, have a peculiar frequency composition. Still another attribute of speech waves is the relatively rapid and often abrupt variations in the intensity of the various frequency components. In view of such considerations as these, it is believed that in so far as the present invention involves sound spectrograms, its ramifications can be best explained in terms of the reproduction of speech spectrograms.

In the interest of a full disclosure of a specific embodiment of the invention, it may be assumed that the speech spectrogram employed in the system to be described is one having the characteristics produced by a spectrogram recorder disclosed in my above-identified copending application, as follows. The spectrogram is two inches wide and has a linear frequency scale extending from 200 to 3700 cycles. Each $\frac{1}{100}$ inch along the scale accordingly represents $17\frac{1}{2}$ cycles.

Second, the frequency definition is that to be obtained by resolving the speech waves into overlapping component bands each 45 cycles wide and differing in mid-band frequency in steps of 17½ cycles, and by employing a recording stylus that is 1/100 inch in diameter to record the varying wave content of the several component frequency bands along parallel lines running across the record surface and spaced 1/100 inch apart. Each single-frequency component appears in the spectrogram as a band the width of which is 45 cycles on the frequency scale; and frequency components that differ by more than 45 cycles appear in the spectrogram as distinct bands. Third, the variations in wave content of the component bands, as displayed on transparent film, are recorded as corresponding variations in transparency or, in other words, the greater the power content the lesser is the density or opacity of the recording.

Fig. 1 illustrates crudely a fragment of such a speech spectrogram, or a positive copy thereof, the dark areas representing regions in which wave power appears. The transverse dimension or width of the spectrogram has the sense of a frequency scale as previously noted and it is so represented in the diagram. The time scale indicates the order in which the successive speech sounds were uttered and recorded. The lower portion of the fragment is representative of a vowel sound; the individual harmonics of the fundamental speech frequency appear, and a gradual increase in pitch is evident. The vowel is followed by an unvoiced sound in which the wave power is distributed more or less continuously over the frequency range with concentration of power in various parts thereof.

Referring more particularly now to Fig. 2, the organization therein illustrated comprises in general outline a transparent "tone disc" 1 that has sinusoidal waves of progressively different frequency recorded in respective concentric tracks of progressively different diameter, a transparent film 2 that has a speech spectrogram recorded thereon as above described, and an electro-optical system for scanning the tone record and the spectrogram, simultaneously, in superposed relation.

The tones recorded on the disc 1 range from 200 cycles to 3700 cycles, in equal steps of from about 15 to 50 cycles, while the tone tracks are equal in width and together cover an annular area the radial dimension of which is two inches, the same as the transverse dimension of the spectrogram. Disc 1 is rotated at constant speed by a motor or other suitable means (not shown) connected to shaft 3.

Disposed radially of the disc 1 is an optical slit symbolized by a mask 4 that has an elongated opening or slit 5 extending radially across all of the tone tracks. Above there are provided elements for concentrating a wide beam of light on the slit 5, these elements comprising a lamp 6 that has a long straight filament, and a concentrating lens 7.

Mounted below the disc 1 in a position to receive the light that passes through slit 5 is an elongated photoelectric cell 8. The output terminals thereof are connected to an amplifier 9 which leads through an equalizer 10 to telephone receiver 11. Each of the tone records passing between the slit 5 and the photoelectric cell 8 modulates a respectively corresponding portion of the wide beam of light, that is, each impresses on the corresponding portion sinusoidal variations in intensity corresponding to the frequency of the recorded tone. These variations in the light beam are translated into corresponding electrical variations by photoelectric cell 8, and the electrical variations are translated into corresponding sound waves by telephone receiver 11. Hence if the light were allowed to pass through only one of the tone records a pure or single-frequency tone would be produced by the receiver 11. If at the other extreme the light beam passed to the photoelectric cell through all of the tone records simultaneously and otherwise unimpeded, a corresponding multiplicity of tones would be produced simultaneously by the receiver 11. The relative intensity of such tones is dependent on the frequency-attenuation characteristic of frequency equalizer 10 which may be made adjustable if desired or fixed to compensate for frequency distortion that is introduced intentionally or inadvertently either in the process of producing the spectrogram or otherwise. Where all of the tones are reproduced simultaneously, the effect is that of resistance noise, for the relation between the frequencies of the several components is irrational and the wave energy is distributed more or less uniformly throughout the audio frequency range of interest.

Film 2 is taken from a supply reel 12 and drawn over the face of disc 1 across the opening 5 to a take-up reel 13 which may be driven by hand or by a motor, not shown, of fixed or adjustable speed. The film 2 is so aligned that the low frequency edge of the spectrogram coincides with the tone record of lowest frequency, and the high frequency edge is correspondingly aligned with the tone record of highest frequency. In such case the frequency scale of the spectrogram lies in registry with the radial frequency scale of the tone disc 1, each tone record being in superposed relation with the part of the spectrogram in which the speech component of the same frequency is recorded. In the operation of the system, therefore, the light passed to the photoelectric cell through any tone record is additionally modulated, or varied in effective intensity, in accordance with the variations in envelope amplitude, or power content, recorded in the superposed part of the spectrogram. The frequency composition of the synthesized complex acoustic wave is thus made to conform substantially with the frequency composition of the speech wave as visually represented in the spectrogram.

The portion of the spectrogram passing slit 5 will be opaque at times (for example, during pauses between words), thus preventing any light from reaching the photoelectric cell 8 and interrupting the flow of sound from receiver 11. At other times when certain consonants are to be reproduced, the portion of spectrogram exposed at slit 5 will allow light to pass more or less uniformly throughout its entire length, the intensity of the transmitted light depending on the power content of the particular consonant. In the reproduction of a vowel sound, the spectrogram blocks all of the tones excepting those corresponding approximately to the fundamental speech frequency and its harmonics, and the unblocked tones are reproduced with the relative intensity pictured in the spectrogram. As the vowel changes in pitch, progressively different sets of tones are reproduced.

Applicant does not represent that the reproduced speech is of natural quality. For the purposes of the present invention, however, it is sufficient that the reproduced speech be clear enough to be understood. The quality may approach that of whispered speech, for specific example, and yet be adequate to convey the speech content. Several factors, it may be explained, conspire to impair the quality of reproduction. One factor of subordinate importance lies in the fact that the number of tones recorded on disc 1 is finite whereas in normal speech any of an infinite number of frequency components may appear. The spectrogram likewise lacks an infinitesimally graduated frequency scale. Thus the frequency scale of the spectrogram may have 200 and not an infinite number of subdivisions, and in each such subdivision of the spectrogram are recorded all of the speech components that fall within a predetermined frequency band, which may be 45 cycles wide, for example, or even 300 cycles wide, as in one instance in practice. Furthermore, a single-frequency component of speech occupies in the spectrogram a band that measures 45 cycles, for example, along the frequency scale. Inasmuch as this is or may be the aggregate width of several successive tone records on disc 1, it will be understood that each single-frequency component may appear in the reproduced speech wave as several simultaneous tones of different frequency. A reproduced voiced sound, it follows, will not consist of tones that are in accurate harmonic relation, but will in general contain a substantially greater number of tones that are only approximately in harmonic relation. Still another and relatively inconsequential factor is that the phase relations existing between the several components of the original speech waves are not preserved in the spectrogram nor maintained in the reproduced waves. The foregoing exposition of factors bearing on the quality of the reproduced speech wave will serve to indicate to those skilled in the art the nature and extent of change that can be expected to follow upon a departure from the specific example herein set forth.

In lieu of the tone disc 1 one may employ, for the whispered reproduction of speech, a disc bearing a large number of uniformly spaced transparent or opaque spots, as pictured in Fig. 2A. These operate on the light admitted through slit 5 to produce a substantially uniform noise spectrum, for the spots passing the slit 5 at any point move with a linear velocity proportional to their distance from the center of the disc and modulate the corresponding portion of the light beam at a correspondingly proportional rate. The radial frequency scale pertaining to such a disc is a linear one matching that of the spectrogram on film 2.

Fig. 3 illustrates a modification of the structure shown in Fig. 2 in which a tone drum 15 takes the place of the tone disc 1. The drum 15 is transparent and the various tones are recorded thereon in respective circumferential tracks underlying the slit 5. A lens 16 disposed longitudinally within the drum 15 concentrates the light admitted through slit 5 on the longitudinally disposed photoelectric cell 8. The latter may be mounted in a socket attached to the housing, and lens 16 may be likewise supported. Drum 15 may be supported and driven by a shaft (not shown) extending through the rear of the housing. The details of design and operation of the Fig. 3 system will be evident from the foregoing description of Fig. 2.

One may advantageously employ a spectrogram 2 that has a logarithmic frequency scale rather than a linear one, in conjunction with a tone disc 1 or tone drum 15 that has a similar logarithmic scale. This yields frequency steps that are considerably smaller at the low frequency end of the scale than at the high frequency end. The recorder employed to product such a spectrogram may resolve the speech waves into 200 overlapping component frequency bands, for specific example, each having a width that is substantially ten per cent of its mean frequency, as disclosed in my said copending application.

It is interesting to observe that in the systems shown in Figs. 2 and 3, the rate of utterance of the reproduced speech depends on the rate at which film 2 is advanced and that it may be varied at will without affecting the pitch. The pitch of the reproduced wave may be varied to suit the operator by varying the rate of rotation of disc 1 or drum 15.

Although in Figs. 2 and 3 I have chosen to illustrate a scanning arrangement utilizing variably transmitted light, it is contemplated that with suitable changes variably reflected light may be employed instead. This will be evident on consideration of the further modification of the invention that is illustrated in Fig. 4.

The organization shown diagrammatically in Fig. 4 is intended and adapted to enable the blind to "read" printed matter. More particularly, it is adapted to scan the successive characters appearing in a line of printed matter and to produce a corresponding succession of sounds, each different character being associated with a different distinctive sound. The sound identifying any particular letter or numeral, or even a punctuation mark, is arbitrary and unintelligible, but it is a distinctive sound and with practice one can learn to recognize it and to identify it with the printed character from which it was derived. In short, what is contemplated is a counter-part of the Braille system enabling the blind to read by ear instead of by touch.

In the bottom of the housing 20 shown in Fig. 4, is a removable plate 21 with a rectangular opening 22 therein that is large enough to expose one or more characters, or words, appearing in a single line of the printed matter, which is supported beneath the housing 20.

Successive letters or words are brought into view in the opening 22 in normal reading sequence, either by hand or by any of various suitable semiautomatic means that will suggest themselves to those skilled in the art, such as a carriage with semiautomatic spacing and line feed as found in the typewriter.

The matter exposed in opening 22 is strongly illuminated by means of a lamp 23 and its associated reflector 24 and condensing lens 25. Directly above the opening 22 is an adjustable optical device, symbolized by lens 26, for focusing an enlarged image of the exposed matter on the under face of a rotatable disc 27. Disc 27 is opaque excepting for a radial slit 5, which may be supplemented if desired by several other radial slits angularly spaced around the disc 27.

Coaxial with the disc 27 and closely spaced directly above it is the tone disc 1 which is driven by a motor 28 of suitable adjustable speed. Above disc 1 is photoelectric cell 8 which is supported at the outer edge of disc 27 and which extends radially over the slit 5. The wave output of photoelectric cell 8 is delivered through slip-rings to amplifier 9 and through an equalizer, if desired, to telephone receiver 11 or other electro-acoustic transducer.

Fig. 5 shows diagrammatically the relationship of parts that may obtain in a typical example in accordance with Fig. 4. Extending vertically across the capital letter shown, is a band that may be regarded as either a vertical element of the space occupied by the printed character or as the slit 5 at a point in its relative movement from left to right across the image of the character. The horizontal bands extending across the letter may be taken either as signifying that the several horizontal elements of the occupied space are associated with respective different tones of progressively higher frequency $f1, f2 \ldots fn$, or as representing the several tone records in their relation to the slit 5 and the focussed image.

If the position of slit 5 at any time is such that the bright illuminated space between letters is focused upon it or, in other words, if the slit is illuminated uniformly throughout its length, all of the tones recorded on disc 1 will be simultaneously reproduced and heard at receiver 11 as a certain characteristic noise. On the other hand, if the image of the non-reflective vertical stem of a letter, such as that of the R represented in Fig. 5, completely covers slit 5, the photoelectric cell remains substantially unilluminated and no sound is heard. In any other relative position of slit 5 some but not all of the recorded tones will be reproduced. Thus, under the conditions indicated at T in Fig. 5, all of the recorded tones except a band of tones near the high frequency end of the tone spectrum and another band of tones somewhat above the middle of the spectrum would be heard simultaneously. As the slit 5 passes relative to and across the image of a letter or other character, the complex of tones heard at receiver 11 will vary in a manner dependent on the configuration of the particular character. Hence the reproduced sound is distinctively different for each distinctively different character.

The rate at which each character is scanned, i. e., the rate at which slit 5 passes from one to another of the vertical elements of the space assigned to a character, is dependent on the rate of rotation of disc 27. The latter may be driven through reduction gearing by motor 28 as indicated in Fig. 4, or by a separate motor of adjustable low speed. The novice, however, may prefer to move the disc by hand, in which case the reduction gearing may be disconnected and an operating lever 30 attached to the disc 27 as shown. If the disc is rotated continuously, it will be understood, the scanned characters will be sounded repeatedly so long as they remain exposed in the opening 22. The novice may prefer also to employ a plate 21 the opening in which is only large enough to expose one or two letters at a time.

The arrangement shown in Fig. 4, comprising a pair of discs 1 and 27, is simpler from a mechanical standpoint than one comprising a corresponding pair of superposed endless belts, but it is appreciated that the parallel relation between the slit 5 and the image of vertical elements in the printed matter, illustrated in Fig. 5, will not strictly obtain except for a character appearing in the center of the opening 22. The "phase distortion" that results from a non-parallel relation may be regarded as negligible and it may be maintained at a tolerable value in any case by restricting the length of the opening 22 or by designing the optical device 26 to reduce the relative length of the image.

The optical device 26 may be so designed and adjusted that the image of the highest or capital letters appearing in the printed matter does not quite cover all of the tone tracks on disc 1. In such case the receiver 11 will at all times produce one or more tones lying at one or the other, or both extremities of the reproduced tonal range.

Although it has been assumed that the printed matter consists of black or other relatively non-reflecting characters on a white or other reflecting ground, the black and white areas may be reversed. That is to say, the invention is applicable to the translation of photostatic or negative copies of ordinary printed matter, for example, or more generally to any case in which the printed characters and the ground have respectively different light reflecting properties. It will be understood too, that the scanning effected by slot 5 is due to relative motion, and that the required relative motion can be obtained by holding disc 27 stationary and moving only the printed matter across the opening 22.

Speech spectrograms and the like can be translated into normal audible form in the Fig. 4 system, given a suitable width of opening 22 and an optical device 26 designed to project the spectrogram into the prescribed relation with the tone records on disc 1. The spectrogram for this purpose would have the appearance of a photographic negative, i. e., light or unmarked power-representing areas on a dark, non-reflecting background. In accordance with this phase of the invention one can envisage a new and unusual "font of type," to be incorporated in typewriters, Linotype machines and the like, and consisting of a phonetic alphabet each phonetic symbol of which is in the form of a spectrogram of the kind described. Matter printed in such symbols and passed across the opening 22 in the Fig. 4 organization would then be automatically read aloud. I contemplate further, that ordinary printed matter may have interpersed therein spectrographic representations of sound, to be reproduced by equipment at home, in school or library. Birdcalls, for one notatable and specific example, could be so printed in the form of a sound spectrogram and, for another, peculiar machinery noises for study by apprentice mechanics.

If ordinary printed matter only is to be translated by the Fig. 4 organization, only a relatively small number of different tones need be recorded on disc 1, the number of tones and the width and radius of the several tone tracks depending on the character and variety of the font or fonts of type employed. It is not essential for such use that the tones be recorded in continuously ascending or descending order; it suffices that a distinctive sound is produced for each different character appearing in the printed matter. The proportions may be so chosen if desired that many of the characters are reproduced as a succession of chords or harmoniously related tones, especially if the printed matter is in the light-on-dark form.

Figure 6:
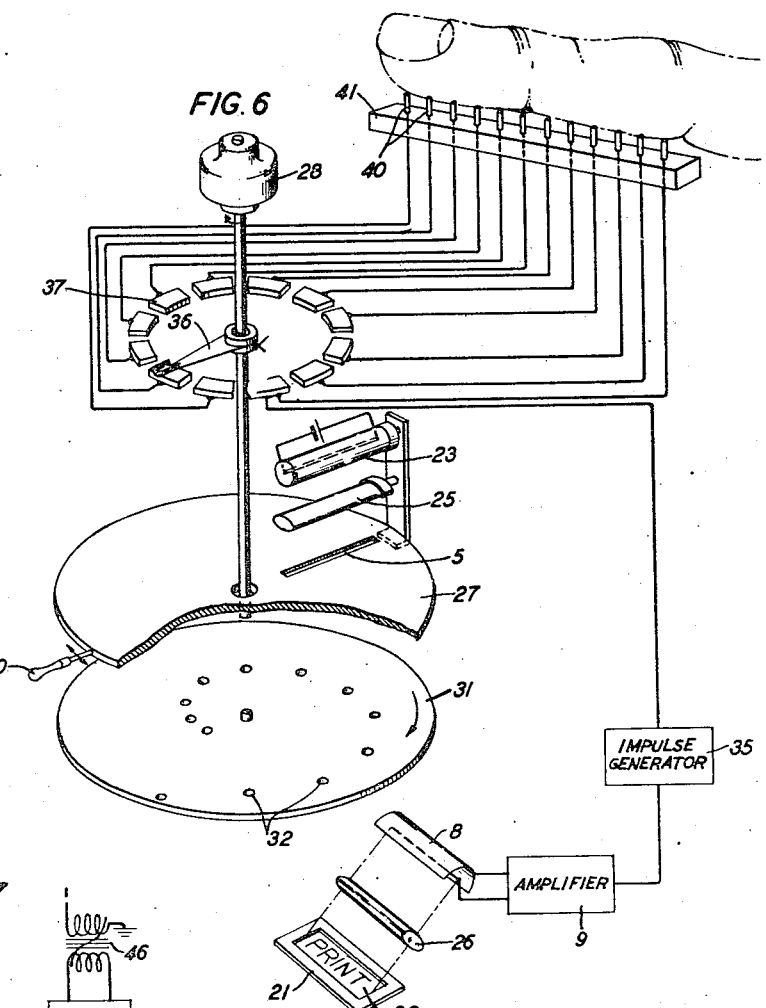
Figs. 6 and 7 illustrate a system for translating printed characters into distinctive tactile impressions.

Whereas the Fig. 4 organization is adapted to translate printed characters into arbitrary distinctive sounds, the organization illustrated diagrammatically in Fig. 6 is adapted to translate printed characters into a form such that they can be identified through the sense of touch. More particularly, provision is made for applying to tactile nerve endings stimuli that are distinctively different for each different character.

Referring to Fig. 6, the printed matter is exposed in an opening 22 in a plate 21 that is disposed below a rotatable disc 27 having a radial slit 5, all as in Fig. 4. Lamp 23 and lens 25 are supported on disc 27 and aligned with slit 5 to project a wide, sharply defined beam of light downward toward opening 22. Directly below and slightly spaced from disc 27 is an opaque disc 31 that has a multiplicity of holes therein arranged in a single-turn spiral and that is rotated at an angular rate many times any angular rate of movement of disc 27. Lens 26 is disposed to collect light reflected from the matter exposed in opening 22 and to focus it on photoelectric cell 8. The latter is connected through amplifier 9 to a high voltage impulse generator 35 which delivers an electrical impulse, or a rapid succession of them upon every change in the amount of light reaching the photoelectric cell 8.

With the parts properly proportioned and disc 27 fixed in angular position, a beam of light is directed to successively different positions along a vertical element (such as T in Fig. 5) of the matter exposed in opening 22, as the holes 32 successively come into registry with slit 5. If the element so illuminated is completely non-reflective, the photoelectric cell 8 remains dark and no impulses are produced by impulse generator 35. If the element is reflective throughout its length then a series of light impulses reach the photoelectric cell and an equal or proportional number of electrical impulses are generated. In general such parts of the element as are non-reflective introduce gaps in the otherwise regular series of electrical impulses.

The electrical impulses generated in generator 35 are conveyed through slip rings to the rotating arm 36 of a commutator. The segments 37 of the commutator are equal in number to the holes in disc 31, of which there may be twelve, for specific example, and they are connected to individual tactile stimulators 40. The latter are of a type adapted for electrical stimulation of the tactile nerve endings and may be simple electrodes as shown. The electrodes 40 are arranged in a row, or in other spaced relation, and mounted on or embedded in a block of insulating material 41.

Assume now for sake of simplicity that the connections from segments 37 and the angular position of contact arm 36 relative to disc 31 are such that the impulse generator 35 is connected to the electrodes 40 in succession beginning with one end of the row as the holes 31, beginning with the outermost, successively pass slit 5. Now each electrode 40 is identified with a particular hole 32 and with a corresponding position along the length of the element T. Hence if say only the uppermost portion of the element is reflective, only the correspondingly positioned electrode or electrodes 40 will receive electrical impulses, such impulses appearing at each electrode in rapid succession, once during each rotation of the disc 31. As disc 27 is rotated, or as the printed subject-matter is advanced across opening 22, the distribution of impulses or tactile stimulation across the row of electrodes 40 changes, and the manner of change depends entirely on the configuration of the character being scanned. Each distinct printed character is thus identified with a distinctive manner of change in the distribution of electrical stimuli along the row of electrodes 40. The bank of electrodes 40 it will be understood, is to be pressed against some appropriate part of the operator's body, the length of a finger as illustrated, the palm of the hand or some other part where the tactile nerve endings are closely spaced.

Figure 7:
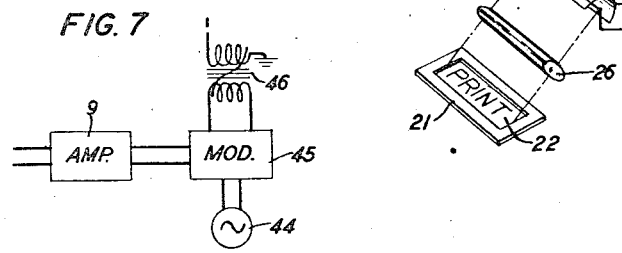

Fig. 7 illustrates schematically a specific form that the impulse generator 35 may take. Alternating current from a source 44 is applied through a modulator 45 to the primary winding of a high voltage step-up transformer 46 that has an easily saturated core such that a sharp high voltage pulse is delivered by the secondary winding each time the current passes through a substantially zero value. The modulator 45 serves as a gate circuit controlled by the currents derived from photoelectric cell 8 and it operates to substantially suppress the flow of current from source 44 to transformer 46 except when light is reflected from the printed matter to the cell 8. Alternatively the modulator may be used to suppress the current flow whenever the cell is illuminated. The operating frequency of source 44 may be sixty cycles per second, for specific example.

In Fig. 6, it may be added, the printed matter may be in the form of black on white or the reverse. In either case each distinctive printed character can be recognized by the characteristic distinctive time change in the spacial distribution of the tickling sensation or tactile excitation associated therewith.

In referring herein to "printed matter" I do not mean to emphasize the mechanism employed to produce the letters, numerals, etc., nor specifically to exclude typewritten matter. The expression is used, rather, to signify that the configuration of each character is substantially the same throughout the matter being "read," whereby the aural or tactile interpretation of each character wherever it appears, has substantially and recognizably the same distinctive quality.

What is claimed is:

1. In combination with a record that bears a succession of visual symbols representing words, means for optically scanning the said symbols in succession, means for detecting in the record any variation in light-reflecting or transmitting quality appearing along each of a multiplicity of collateral bands extending across each scanned symbol, means for generating a corresponding multiplicity of sensory stimuli perceptible to a natural sense other than the visual sense, and means for varying the intensity of all of said sensory stimuli concurrently and individually in conformity with the variations detected in respectively corresponding collateral bands.

2. In combination with a record that bears a succession of word-representing visual symbols in the form of a speech spectrogram, means for optically scanning the said symbols in succession, means for detecting in the record any variation in light-reflecting or transmitting quality appearing along each of a multiplicity of collateral bands extending across each scanned symbol, means for generating a multiplicity of waves of different frequency, means for varying the intensity of all of said waves concurrently and individually in conformity with the variations detected in respectively corresponding collateral bands, and means for translating all of said varying waves into a single speech wave.

3. In combination with a record bearing a succession of printed symbols representing words, means for optically scanning the said symbols in succession, means for detecting in the record any variation in light-reflecting or transmitting quality appearing along each of a multiplicity of collateral bands extending across each scanned symbol, means for generating a multiplicity of waves of different frequency, means for varying the intensity of all of said waves concurrently and individually in conformity with the variation detected in respectively corresponding collateral bands, and means for synthesizing a complex acoustic wave from said varying generated waves.

4. In combination with a record bearing a succession of printed symbols representing words, an apparatus for translating the said printed symbols into a form to be apprehended by the sense of touch, which apparatus comprises means for optically scanning said symbols in succession, means for detecting in the record any variation in light-reflecting or transmitting quality appearing along each of a multiplicity of collateral bands extending across each scanned symbol, means for generating a tactile stimulus at each of a multiplicity of spaced points, and means for varying the intensity of said tactile stimuli concurrently and invidually in conformity with the variation detected in respectively corresponding collateral bands.

5. In combination with a speech wave record that has the variation in envelope amplitude of the several frequency components of said waves recorded in separate portions of the record respectively individual to the several components, means for generating a multiplicity of waves each substantially corresponding in frequency to a respective frequency component, means for varying the intensity of each of the said generated waves under the control of the respectively corresponding envelope amplitude record, and means for synthesizing a speech wave from the several varying generated waves.

6. An apparatus for translating printed matter which comprises detecting substantially simultaneously the distribution of light and dark portions in each of a multiplicity of different elements of an area embracing a printed character, means for similarly and successively detecting the distribution of light and dark portions in areas embracing respective successive printed characters, means for generating waves having a multiplicity of different frequency components, means for continually changing the relative intensities of said frequency components in predetermined correlation with variations, from one said element to another, in the said distribution of light and dark portions, and means for translating said frequency components of changing relative intensity into a complex sound wave.

7. An apparatus for translating printed matter which comprises means for detecting substantially simultaneously the distribution of light and dark portions in each of different collateral elements of an area embracing a printed character, means for similarly and successively detecting the distribution of light and dark portions in areas embracing respective successive printed characters, means for generating a tactile stimulus at each of a multiplicity of spaced points on a human body, and means for continually changing the relative intensities of said stimuli in predetermined correlation with variations from one said element to another in the said distribution of light and dark portions.

8. A system for translating printed matter comprising means for optically scanning in succession the several spaces occupied by successive printed characters in said matter, said scanning means including a source of light, photoelectric means, and means for exposing said photoelectric means in predetermined succession to the light emanating from each of the different component areas of a given space, a multiplicity of tactile stimulators, an excitation circuit actuated by said photoelectric means, and means for commutatively connecting said circuit to said stimulators.

9. A system in accordance with claim 8 in which said stimulators provide electrical stimulation, and in which said excitation circuit includes an electrical impulse generator.

10. A system for translating printed matter comprising optical means for scanning the space occupied by a line of printed matter, one substantially vertical band after another, said scanning means including means adapted to illuminate in time-spaced succession different areas within each such band, photoelectric means actuated by light reflected from the successively illuminated areas in any said band for producing respectively corresponding electrical pulses selectively in dependence on the amount of light reflected from the corresponding area, a multiplicity of spaced tactile stimulators, and commutator means synchronized with the said scanning means for applying said electrical pulses selectively to respectively corresponding tactile stimulators.

11. A system in accordance with claim 10 in which said tactile elements are electrodes.

12. In a system for translating printed matter, means for illuminating the space occupied by any printed character appearing in the said matter, optical means for focusing light reflected from said space, photoelectric means exposed to the focused reflected light, aperture means for restricting the light to which said photoelectric means is exposed at any time to that reflected from a band that is movable relative to and across said space, means for impressing tone variations of different frequency on respective different parts of the light reflected from said band, and means for converting electrical waves produced by the variable illumination of said photoelectric means into corresponding sound waves.

13. In a system for translating printed matter, electrooptical means for scanning the space occupied by any printed character appearing in the said matter comprising photoelectric means for converting variations in the intensity of incident light into corresponding electrical variations, means for directing to said photoelectric means light reflected from each of a multiplicity of elements of said space which elements together define a band extending across said space, means for sweeping said band laterally relative to and across said area, means for impressing on the light reflected from the different elements intensity variations of respectively different frequency, and means for translating the said electrical variations into corresponding sound waves.

14. In a system for translating printed matter, optical means for projecting an image of any given printed character appearing in said matter, means for scanning said character comprising an elongated aperture movable relative to and across the said image, photoelectric means responsive to light passing through said aperture, means for varying the intensity of the light passing through different parts of said aperture at correspondingly different frequencies, and an electroacoustic reproducer actuated by said photoelectric means.

15. In combination with a speech wave record of a kind in which the variations in envelope amplitude of the several frequency components of the recorded wave are recorded in visual form along distinct collateral portions of the record respectively individual to the several components, means for optically scanning the several said portions simultaneously to derive from each said portion light that is modulated in conformity with the variations in envelope amplitude recorded in the said portion, means for simultaneously impressing on the light from the several said portions periodic variations in intensity of a different frequency for each different portion, whereby the light from each said portion is doubly modulated, means for translating the doubly modulated light from all of said portions into electrical waves, and means for translating the said electrical waves into sound waves.

16. A system for translating a record that bears a succession of visual symbols representing words, comprising a light source positioned to illuminate said record, a photoelectric cell positioned to receive light from said record, an optical slit positioned crosswise of said record to restrict the light received by said cell from said record at any time to that coming from an elongated elemental area of said record extending crosswise thereof, means for moving said optical slit longitudinally of and relative to said record to effect scanning thereof, a continuously driven optical modulating member positioned in the path of the said light received by said photoelectric cell, said member having a multiplicity of light interrupting elements individual to and operative on the portions of said received light that come from corresponding portions along said elongated elemental area of said record, and means for translating the complex electric wave generated in said photoelectric cell by the modulated light received thereby into a complex sensory stimulus.

RALPH K. POTTER.

REFERENCES CITED

The following references are of record in the file of this patent:

UNITED STATES PATENTS

| Number | Name | Date |
|---|---|---|
| 1,790,985 | Grondahl | Feb. 3, 1931 |
| 1,733,605 | Jones | Oct. 29, 1929 |
| 2,228,782 | Sharples | Jan. 14, 1941 |
| 1,828,198 | Naumburg | Oct. 20, 1931 |
| 2,327,222 | Sell | Aug. 17, 1943 |
| 1,320,366 | Housekeeper | Oct. 28, 1919 |
| 1,453,741 | Brodeur | May 1, 1923 |
| 1,487,115 | McQuarrie | Mar. 18, 1924 |

FOREIGN PATENTS

| Number | Country | Date |
|---|---|---|
| 295,598 | Germany | 1916 |
| 176,962 | Switzerland | 1935 |
| 242,291 | Great Britain | 1926 |